Patented Jan. 7, 1930

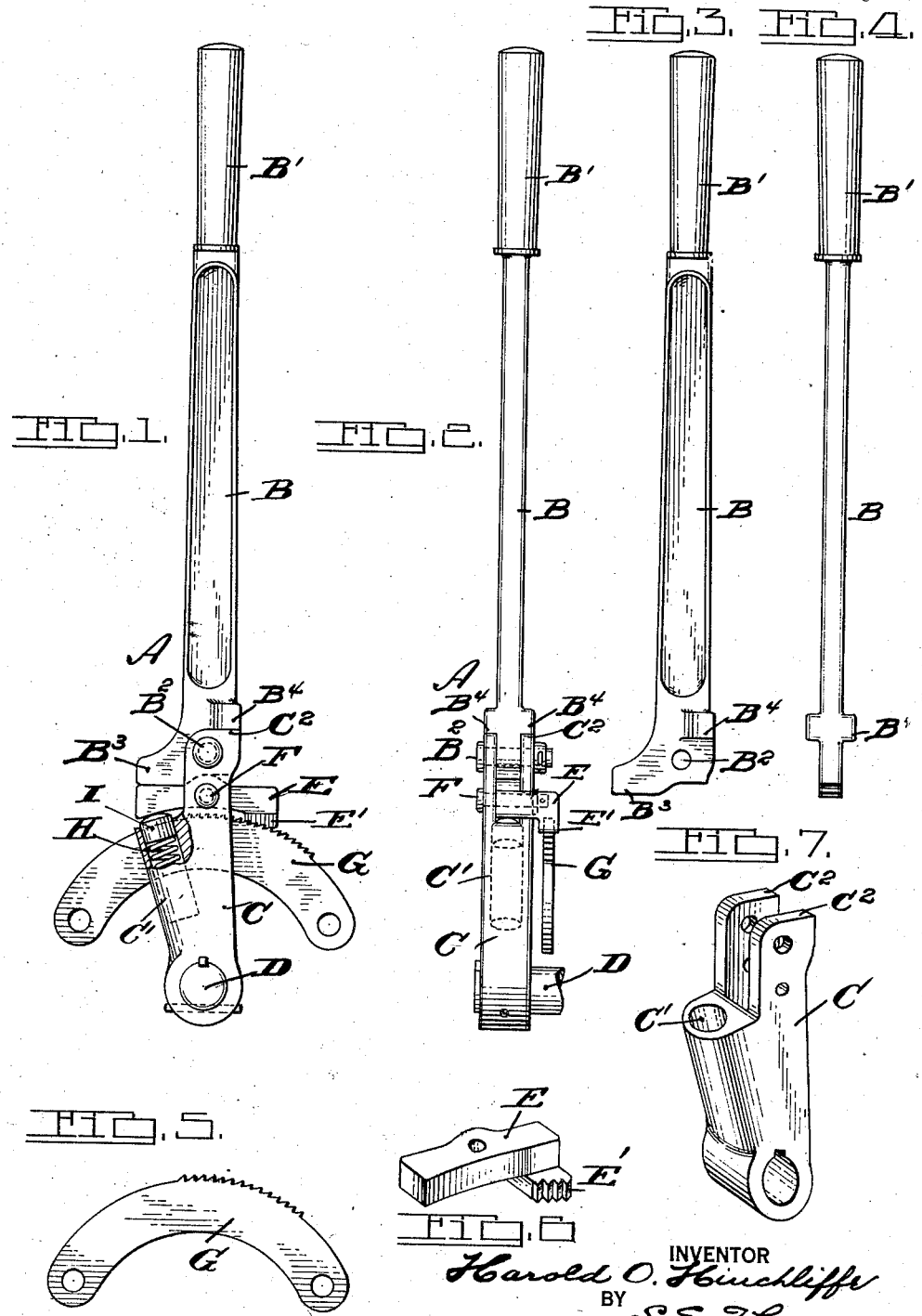

1,742,351

UNITED STATES PATENT OFFICE

HAROLD O. HINCHLIFFE, OF MIDDLETON ST. GEORGE, ENGLAND

LOCKING LEVER FOR HAND BRAKES FOR MOTOR CARS

Application filed February 14, 1929, Serial No. 339,952, and in Great Britain May 9, 1928.

My invention relates to hand brakes for motor cars shown in the accompanying drawings and more particularly described in the following specification and claim.

Braking levers provided with a spring actuated locking pawl released by a hand-grasping pressure applied to a controlling bell-crank lever, adjacent the handle of the brake lever, are well-known.

The constant operation of this type of brake lever however soon tires the driver's hand and arm and from a mechanical standpoint is considered undesirable and inefficient.

The primary object of the present invention therefore is to overcome these and other objections to brake levers of this type now in general use.

One object of the present invention therefore is to eliminate the usual spring actuated pawl engaging a segmental ratchet bar for locking the brake lever,—operated by a bell-crank lever located adjacent the handle of the brake lever, that it may be conveniently grasped to release the latter.

It is also the purpose of the present invention to provide a brake lever which when manually rocked automatically releases the brake mechanism—if in previously locked braking position—without the necessity of applying muscular effort to grasp and compress a spring actuated lever, as required when releasing the locking mechanism in the type of brake lever just described.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation of the brake lever showing a portion broken away to disclose the spring bolt for tilting the ratchet locking trigger.

Figure 2 is an end elevation of the brake lever.

Figure 3 is a detail, showing in side elevation the upper section of the brake lever.

Figure 4 is an edge elevation of the same.

Figure 5 is a detail view showing the segmental rack-bar.

Figure 6 is a perspective view of the ratchet locking trigger.

Figure 7 is a perspective view of the lower section of the brake lever.

According to the present invention, the controlling brake lever A comprises an upper and lower section.

The upper section B of the lever is provided with a handle $B^1$ for convenience of operation, its lower end being pivoted at $B^2$ between the bifurcated walls of the lower section C of the lever which is in turn keyed and pinned to a brake shaft D;—a fragment of which is shown.

E denotes a tilting trigger—pivoted at F between the walls of the lower section of the lever,—having an offset ratchet portion $E^1$ on one side to engage the teeth of a segmental ratchet bar G, bolted or otherwise secured to a vehicle frame;—not shown.

Lodged in a chamber $C^1$ in the lower section of the lever is a compression spring H, bearing at one end against the wall of the chamber and at the other end upon a movable plunger I, which in turn presses against the projecting end of the tilting ratchet trigger, forcing the teeth of the latter into engagement with the teeth of the segmental bar,—thereby locking the lever in its adjusted position.

At the lower end of the upper section B of the lever is a forwardly extending toe $B^3$, against which the end of the tilting ratchet trigger bears, under the urge of the spring H, that its teeth may engage the teeth of the segmental ratchet bar, from which they may be released upon rocking the lever.

The edge of the walls of the lower section of the lever form shoulders $C^2$, which receive the thrust of the lugs $B^4$ projecting from each side of the upper section B of the controlling lever, upon rocking the lever in a backward direction preparatory to setting the brake mechanism.

Having now indicated the several parts by reference letters, the construction and operation of the device will be readily understood.

It will first be noted the arrangement of the device is such that the controlling lever A is normally locked against movement in the direction taken when releasing the brake.

When pressure is manually applied to the controlling lever to release the brake, the projecting toe $B^3$ of the lever bears upon the tiltable trigger E, forcing down the plunger I against the action of the spring H, thus effecting the disengagement of the teeth of the trigger E from the teeth of the segment G and thereby releasing the brake.

To set the brake, the lever is rocked in the opposite direction, the lugs $B^4$ of the upper section bearing upon the shoulders $C^2$ at the upper end of the lower section of the lever, which then operates as a unitary structure to set the brake mechanism, the lever being automatically locked by the rocking trigger when this is effected.

What I claim is:—

A device of the character described consisting of a divided manually operated brake lever comprising upper and lower sections, the upper section of the lever having a handle at one end, with a projecting toe piece and abutment lugs adjacent the opposite end; the lower section of the lever being adapted for engagement to a brake shaft, and pivoted to the lower end of the upper section of the lever, with shoulders to receive the thrust of the abutment lugs of the upper section of the lever; a segmental ratchet; a rocking trigger pivoted to the lower section of the lever having teeth adapted to interlock with the teeth of the ratchet segment; a spring actuated plunger lodged in a chamber in the lower section of the lever, adapted to bear upon the trigger to force the teeth of the latter into interlocking relation with the teeth of the segment, said rocking trigger being adapted to be automatically released from interlocking relation with the teeth of the segment upon rocking the controlling lever, whereby the projecting toe of the latter may bear upon the rocking trigger to release the latter from engagement with the teeth of the segment.

In testimony whereof, I sign this specification.

HAROLD O. HINCHLIFFE.